United States Patent [19]

Tripp

[11] 3,907,452

[45] Sept. 23, 1975

[54] TOOL GUIDE

[76] Inventor: Walter C. Tripp, 5590 Briarhills Ln., Reno, Nev. 89502

[22] Filed: Oct. 1, 1973

[21] Appl. No.: 402,101

[52] U.S. Cl. .................... 408/56; 408/72; 408/76; 408/84; 408/111
[51] Int. Cl.² ..................................... B23B 45/14
[58] Field of Search ............. 408/76, 110, 111, 112, 408/72 R, 72 B, 84, 56; 33/189

[56] References Cited
UNITED STATES PATENTS

| | | | |
|---|---|---|---|
| 100,772 | 3/1870 | Kelly | 408/84 |
| 385,133 | 6/1888 | Perkins | 408/84 X |
| 521,206 | 6/1894 | Covel | 408/84 |
| 3,381,551 | 5/1968 | Lavering | 408/72 |

*Primary Examiner*—Gil Weidenfeld
*Attorney, Agent, or Firm*—Herbert C. Schulze

[57] ABSTRACT

This is a method and apparatus for the drilling and tapping of holes in various materials, particularly upon rounded surfaces, upon exceptionally hard material, and the like, in which the method contemplates the correct angular guidance of the drill and/or tap by means of a cooperating guide so adapted as to rest upon the surface at the correct angular and positional relationship, through which the drill or tap is operated.

6 Claims, 21 Drawing Figures

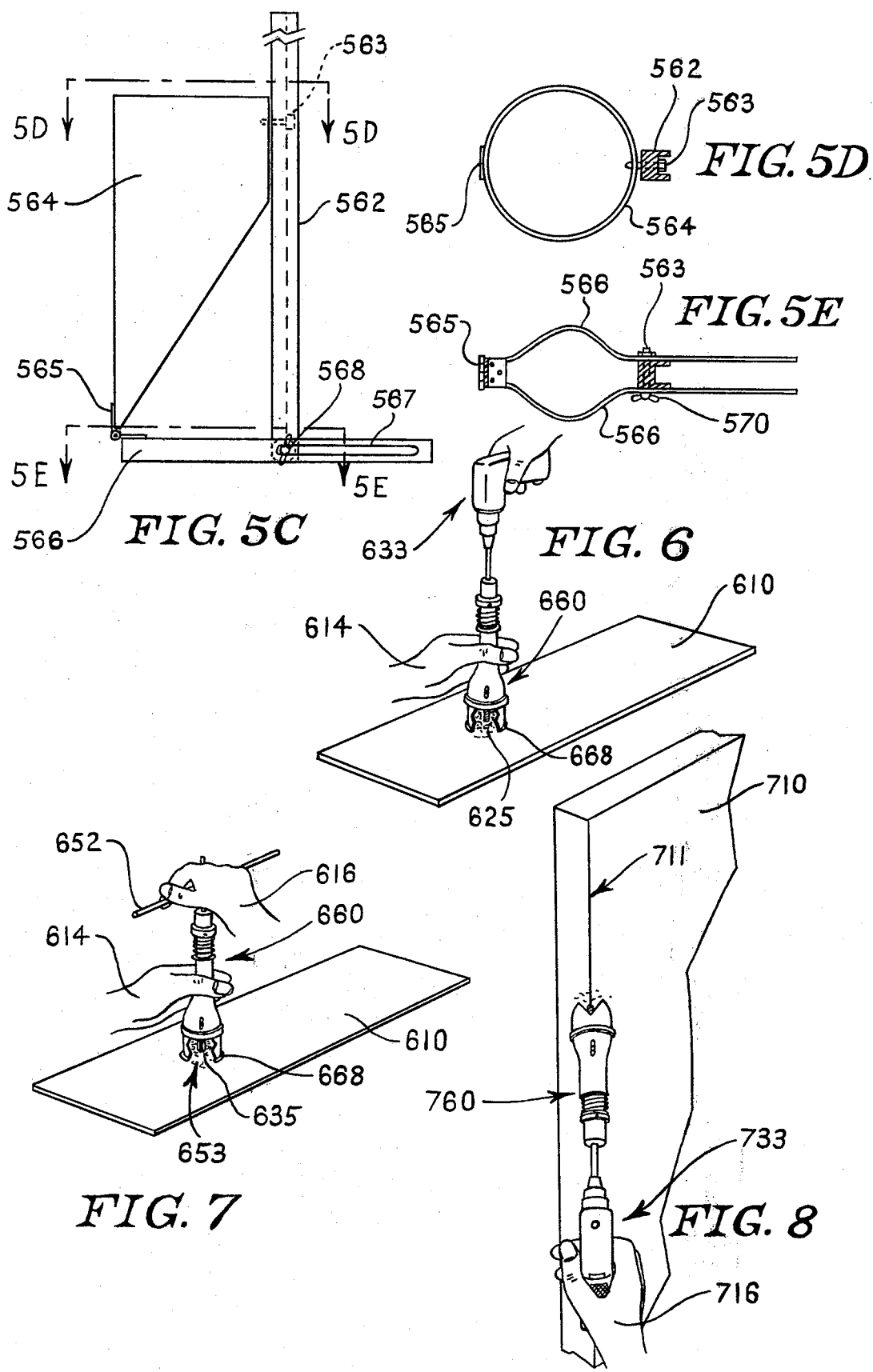

TOOL GUIDE

BACKGROUND OF THE INVENTION

1. Field of the Invention

This invention is in the general field of drilling and tapping holes in materials of various kinds by hand or by power and more particularly in the field of a method and apparatus for achieving appropriate angular and positional alignment of such holes.

2. Description of the Prior Art

There have been many developments in the field of proper positioning of drills, and the like, for appropriate alignment with the work upon which one is engaged. All of such prior art has consisted of devices, and the like, to hold work with relation to a drill, tap, or the like, being utilized. There have likewise been drill presses manufactured for purposes of attempting to hold a drill in a particular angular relationship with the relation of the work piece in mind.

All of such prior developments have involved stationary drilling arrangements, with the exception of those drill presses which might be mounted on a portable, magnetic base to adhere to a plate of steel or the like.

The only portable devices as mentioned are wholly unsuited to placement upon an irregular surface, such as a pipe, or the like, hanging over head and rather inaccessible without space for a large drill press and in a place where one cannot be mounted, and such devices further do not incorporate means for holding satisfactorily upon large surfaces of materials which are not suitable to be gripped by magnets, or the like, such as uneven and very large surfaces of plastics, nonmagnetic metals, and the like. In this sense there has been no prior art developed to date.

SUMMARY OF THE INVENTION

In the various mechanical trades and in the manufacture of articles of manufacture of all types, the use of drills for the purpose of providing holes for passageways, and the like, is widespread. Likewise, the use of taps to form threads in many of such holes for fastening purposes is very widespread. All persons who have engaged themselves in these arts are familiar with the problems both of drilling and of tapping wherein holes must be at a given angular relationship (frequently exactly perpendicular to a particular plane). Not only is this difficult in drilling, particularly in areas which are large and not suitable to be placed beneath a customary drill press, but also, particular difficulty is encountered in tapping such holes appropriately and many taps are broken in this manner.

I have studied this problem and have developed a method by which a drill, whether hand operated or power operated, and, likewise, a tap, whether activated by hand or power, may be quickly and effectively utilized to drill holes properly aligned with angular relationship to the surface concerned and to tap those holes which are so aligned without the usual frequency of breakage.

I have also provided a method and means by which a coolant material may be confined within the drilling area avoiding numerous problems of contamination of adjoining work, and in which the chips resulting from such work may be confined and not contaminate the work or areas or find their way into delicate machine parts, such as bearings, and the like.

In the development of this method and apparatus I have also made provision for an unusual means for holding this drill and tap guide upon a sheet of magnetic material by a magnetic ring arrangement.

Also, by the use of this method and apparatus, it is possible to drill overhead and to confine the chips and the like so they do not fall upon the person operating the drill or otherwise fall into the area from which the drilling is being performed.

It is an object of this invention to provide a method and apparatus for drilling holes in virtually any material at any location and at predetermined angular relationships and the like.

Another object of this invention is to provide a method and apparatus for tapping holes in predetermined and desired angular relationships with ease and reduction of danger of breakage;

Another object of this invention is to provide a method and means to confine coolant utilized in connection with drilling and tapping within the area upon which work is being performed;

Another object of this invention is to provide a method and apparatus for confining chips resulting from drilling and tapping operations.

The foregoing and other objects and advantages of this invention will be understood by those skilled in the art upon reading the Description of a Preferred Embodiment which follows in conjunction with the appended drawings.

BRIEF DESCRIPTION OF THE DRAWINGS

FIG. 5C illustrates another adapter to hold the lower portion of the apparatus of FIG. 3 in which angular relationships of varous degrees may be achieved;

FIG. 5D is a section on 5D—5D of FIG. 5C;

FIG. 5E is a section on 5E—5E of FIG. 5C;

FIG. 6 illustrates in partially broken away perspective the use of the method and apparatus of this invention in drilling a hole;

FIG. 7 illustrates in partially broken away perspective the use of the method and apparatus of this invention in tapping a hole;

FIG. 8 illustrates in perspective the use of this method and apparatus in drilling into a sharp corner position;

DESCRIPTION OF A PREFERRED EMBODIMENT

An examination of FIGS. 1, 1A, 1B, 1C and 1D, will reveal the present general method of tapping a hole in an article such as for example a pipe as shown in those figures. In this case, it might be presumed that the pipe is being drilled for the installation of a small sprinkler head or the like, such as is common, and is frequently desired to be accomplished in existing lines and in remote areas such as a garden or a field, where it is not feasible to use a drill press to achieve accuracy of alignment.

Figure 1:
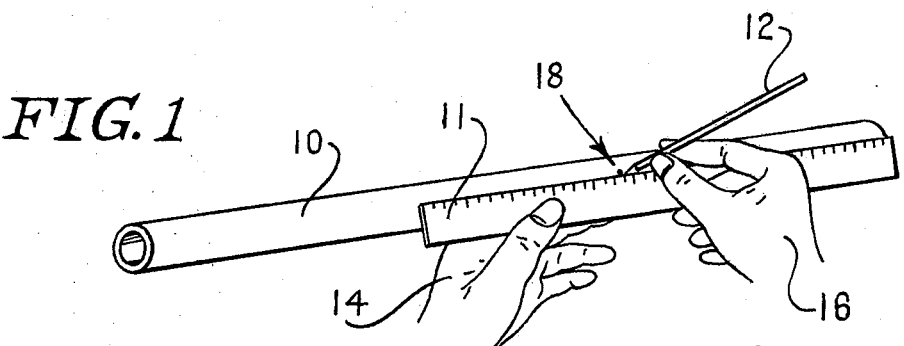
FIG. 1 illustrates the general existing method of marking where a tapped hole is required.
Figure 1A:
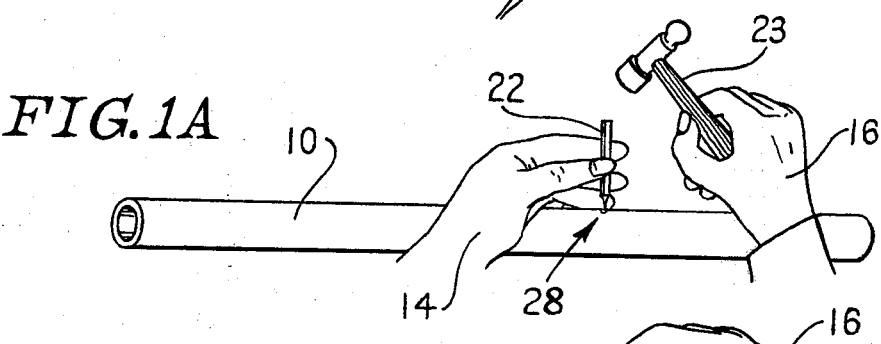
FIG. 1A illustrates center-punching the position to be tapped in the customary manner.
Figure 1B:
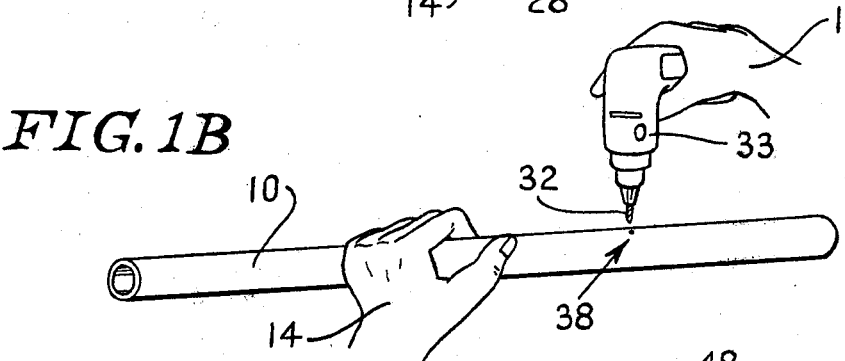
FIG. 1B illustrates center-drilling of the center-punched position in the usual manner.

As illustrated in FIG. 1 the pipe 10 has a mark placed at position 18 by a pencil or the like 12 held by a person's hand 16 usually utilized in conjunction with a ruler or other article for measurement 11 held also by the person's other hand 14. After the mark has been affixed, and as is shown in FIG. 1A, the person now takes a center-punch 22 with one hand 14 and with a hammer or the like 23 held by the other hand 16 causes a center-punch mark or depression 28 to be formed in the surface of the pipe. This is necessary so that the drill will not wander when it is attempted to drill an accurate hole.

Figure 1C:
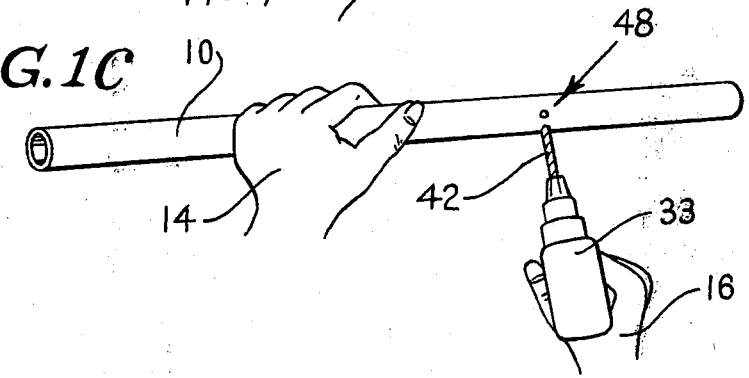
FIG. 1C illustrates the drilling of the hole in the usual manner.
Figure 1D:
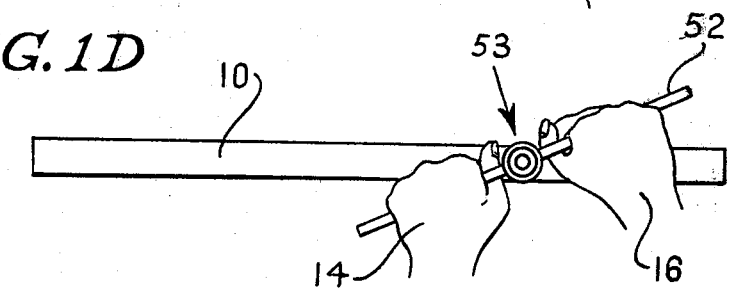
FIG. 1D illustrates tapping in customary manner.

Customarily it is still not sufficient to drill with the finish drill even with the center-punch mark, and for accuracy and to prevent wandering of the drill or misalignment, it is necessary for the person doing the work to utilize a center-drill 32 normally operated by an electric drill 33 or the like to form a center drill hole 38. In FIG. 1C it will be noted that the drill 33 has had a new drill bit 42 placed in it and a proper sized hole 48 for tapping has been provided in the pipe 10. FIG. 1D illustrates the actual tapping wherein the tap holder 53 with handles 52 is holding a tap, not shown since it is beneath the view of this illustration, which is so illustrated to show the careful necessity of correct alignment in order to achieve proper tapping of the hole.

Each of these operations is delicate and difficult, particularly on an article such as a piece of pipe as is here illustrated.

It will particularly be understood by those skilled in the mechanical arts that a slight angularity from the angularity of the drilled hole will cause the tap to bind and it may easily be broken by workmen who are not thoroughly skilled or who are not careful of the exact alignment of the tap. Additionally the alignment must be checked frequently during the tapping operation.

Figure 2:
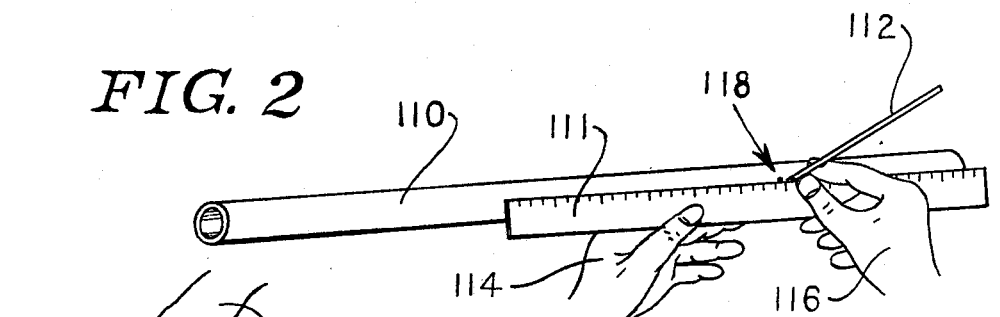
FIG. 2 illustrates the marking of a position for a tapped hole in exactly the same manner as FIG. 1, but for the purposes of tapping in the method of this invention.
Figure 2A:
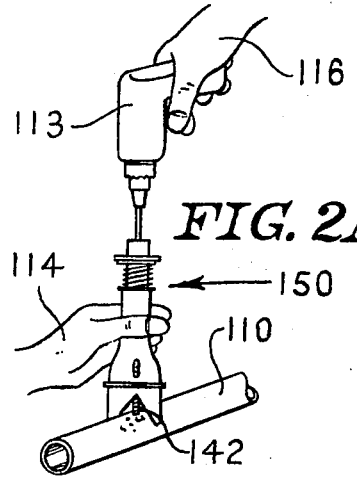
FIG. 2A illustrates the drilling of the hole by the method and apparatus of this invention.
Figure 2B:
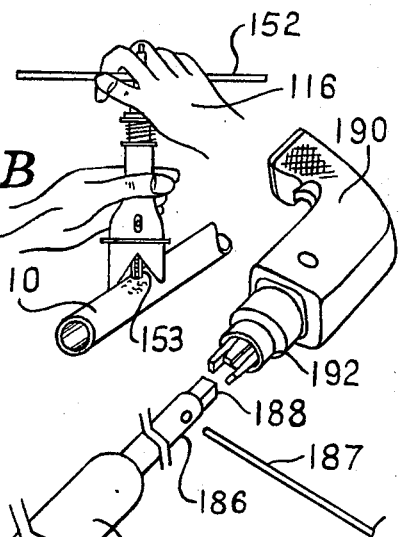
FIG. 2B illustrates tapping by the use of the method and apparatus of this invention.

The greatly improved method of this invention for tapping a pipe is shown in FIGS. 2, 2A and 2B. FIG. 2 illustrates the marking of the position of the hole which of course is no different than that shown in FIG. 1. In this case the pipe 110 is marked by the workman in his hand 116. A ruler or other article for making the location 111 is held by the other hand 114 of the operator and the mark 118 is shown to be at the desired position.

In FIG. 2A, the workman is holding in his hand 114 an apparatus generally 150 for practicing the method of this invention. The apparatus is seen to be used in conjunction with an electric drill or the like 113 held by hand 116. The drill 142, of the correct finished size for the hole to be tapped, is being directly drilled into the position marked on the pipe 110.

FIG. 2B shows the workman holding the apparatus for practicing the method of this invention in his hand 114, and with his other hand 116 turning the handle 152 of a top 153, making the finished hole in the pipe.

The configuration of the lower portion of the apparatus 150 rests at a radial relationship to the pipe as will be readily apparent to those skilled in the art.

Figure 3:
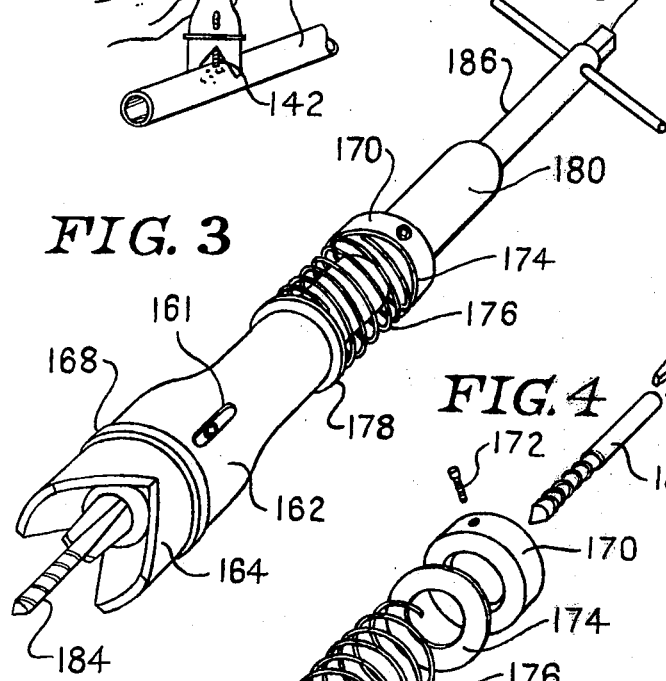
FIG. 3 is a perspective of a preferred embodiment of an apparatus to practice the method of this invention.
Figure 4:
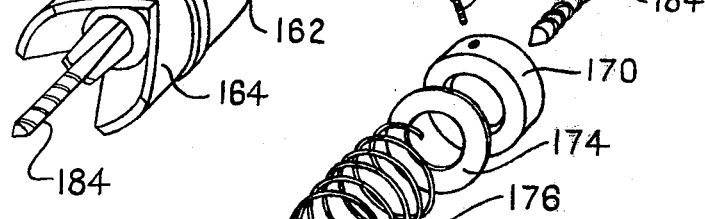
FIG. 4 is an exploded view of the elements of FIG. 3 with the additional illustration of a hand held power drill which would be used with the apparatus.

FIGS. 3 and 4 may be viewed together and will illustrate a preferred embodiment of an aparatus to perform the method of this invention. It is noted that the apparatus comprises a housing 162, which is hollow, and the upper part of which forms on its inner surface a bearing surface in which the shank 180 may rotate and slide. The housing may preferably be made of a suitable plastic material or suitable metal such as bronze or the like. The shank should be made of a suitable material such that it will cause a proper bearing surface with the housing and such materials are well known to those skilled in the art.

The housing incorporates a ring 168 as shown which will be used as a stopping and setting position for other attachments as will be described below. The lower portion of the housing has a V-shaped configuration cut into it as illustrated for properly conforming to irregular or round surfaces such as was illustrated in FIG. 2A. The housing is also provided with a portion of its lower edge 164 being circular in two places so as to rest conveniently upon a perfectly flat surface. A slot 161 is provided through the housing 162 to provide access for a drill chuck key or the like for the replacement of drills in the chuck 182 attached to the shank 180. Such means of opening and closing chucks will be clear to those skilled in the art.

A suitable drill or the like (a tap, when the tapping operation is desired) 184 is held by the chuck 182 in a customary manner. The collar 170 is fastened by setscrew 172 upon the shank 180 at any desired height. Depending upon the position upon the shank 180 to which the collar is attached, the depth of the drilling into the material being drilled can be controlled. A bronze, or other suitable washer or other bearing surface 174 is provided between the collar and spring 176 at one end and a like washer or the like 178 is provided between the spring and the housing at the other end.

The shaft 186 which extends above the shank 180 preferably will have the upper portion 188 formed square or in other suitable configuration to be easily gripped by a wrench or the like if desired. Additionally, a handle 187 may be provided to slip through a hole provided through the shaft 186 as shown if it is desired to use the same for any drilling or tapping purposes.

An electric drill or the like 190 having a chuck 192 suitable to grip the shaft 186 will likewise be normally used for many of the operations.

Figure 5:
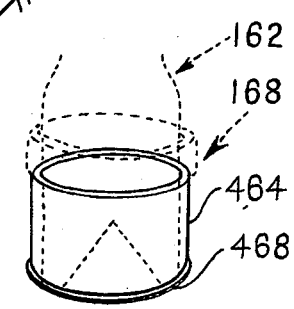
FIG. 5 illustrates a bottom adapter for the apparatus of FIG. 3.

FIG. 5 shows a base for the apparatus of FIG. 3 in which the housing 162 and the guide-ring 168 are shown in phantom to illustrate its purpose. The end piece is merely a cylindrical section 464 open at both its ends, and in this case illustrated with a rubber ring 468 which will form a seal between the base piece 464 and the surface upon which it will rest. By the use of this device it will be possible to flood the interior with cutting fluid or the like and the same will be contained and will not spread out over the work piece.

Figure 5A:
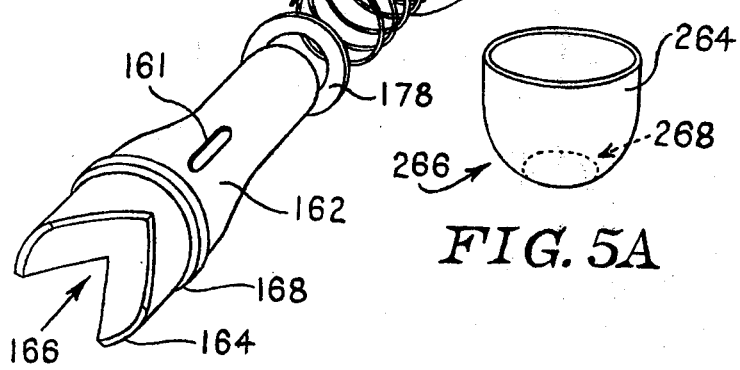
FIG. 5A illustrates another adapter for the bottom of the apparatus of FIG. 3.

FIG. 5A shows a device for the end positioning which is utilized in a matter similar to that of FIG. 5. The difference is that in this case there is a cylindrical portion 264 suitable to engage the entire length of the housing beneath the ring 168 and beneath which there is a rounded portion with a hole in the bottom so that it may fit appropriately into certain rounded areas desired to be drilled.

Figure 5B:
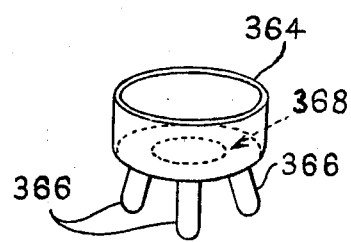
FIG. 5B illustrates another optional adapter for the bottom of the apparatus.

The element shown in FIG. 5B is utilized for drilling on any irregular surface since with the three legs 366 fastened to the cup-like item 364, any surface may be accommodated and the drill passes through the center hole 368.

FIG. 5C illustrates a particularly interesting lower adapter for the base of the apparatus in which a cylindrical portion 564 having a thickness essentially the same as the thickness of guide-ring 168 is provided. The inner diameter of 564 will accommodate the outer diameter of housing 164. It is noted that this tubular portion is tapered at its lower edge as illustrated and it is hinged at 565 by means known in the art to base arms 566.

The arms 566 are shaped in the manner indicated so as to accommodate the changing position as hereinafter described and for the drill and the drill chuck to be able to penetrate thereto. The arms 566 are fastened by appropriate bolt 563 and wing nut or the like 570 to the upright member 562, which is fastened by a swivel bolt 563 the details of which are not shown but which will be understood by those skilled in the art and which slides in a slot provided the length of 562. The arm 562 further slides by utilizing the wing nut 570 to loosen and tighten in its relationship to the arms 566 through the slots 567 extending a distance along the sides of said arms. The bottom edge of the arm 562 is rounded as indicated at 568 so as to prevent binding upon corners as it is moved along.

FIG. 5C taken with FIGS. 5D and 5E will make clear the construction of this unique arrangement which will allow for the angular positioning of the drill guide attachment and will be apparent to those skilled in the art. Further details of construction and alternate methods of construction will be apparent, likewise.

The apparatus of FIG. 5 will be seen to be usable for the purpose of drilling into ceilings or other overhead locations and will catch and confine the chips or other debris resulting from the drilling operation so it does not fall into the eyes of the operator or otherwise disturb the area. If desired, a piece of tape or the like may be placed over the drill chuck key slot in the device to prevent anything at all from having any possibility of dropping out during the operation. When such an overhead operation is completed, the material may be then dumped out of the end and into a trash container or the like.

FIG. 6 illustrates the confinement of chips and the like within the base of the device when being used with the adapter of FIG. 5. In FIG. 6 it will be seen that a plate of material 610 is having a hole drilled into it by the use of an embodiment of this invention 660 which is similar to the device illustrated in detail in FIG. 3. An electric drill 633 is being operated and the device 660 is being held by the operator's hand 614. The rubber sealing ring 668 is the equivalent of the rubber sealing ring 468 shown in FIG. 5, and the chips, fluid, and the like 625 is seen to be confined within the area. Of course a piece has been broken away to show the confined chips but it is understood that in use the bottom adapter will be a closed cylinder.

A similar operation to that of FIG. 6 is shown in FIG. 7 but in this case a tap is being used rather than a drill. The device 660 is being used with the handle 652 operated by the operator utilizing one hand 616 to turn the tap handle and the other hand 614 to hold the device. In this case the operation is shown on the same piece of material 610 in which the hole previously drilled is now being tapped by tap 653, and the chips and the like 635 are seen to be confined.

An extreme use of the apparatus as illustrated is shown in FIG. 8. In this case a sheet of material 710 having a sharp corner 711 is being drilled directly into this sharp corner by utilization of an embodiment of the apparatus 760, which embodiment is essentially identical to the embodiment shown in detail in FIG. 3. An electric drill is again being used as illustrated at 733, and the operator's hand 716 is shown to be utilizing the drill.

No hand has been shown holding the device 760 in order that greater clarity be given to this illustration.

Figure 9:
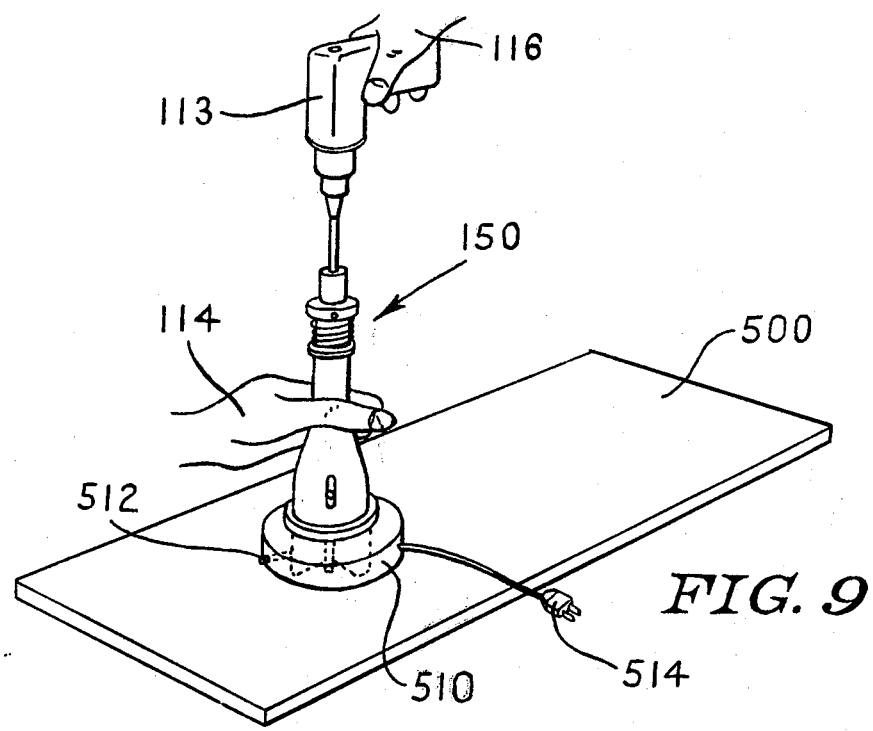
FIG. 9 is a perspective view of the use of this method and device incorporating an alternative magnetic holding device.

FIG. 9 shows a device generally 150 similar to the detailed embodiment of FIG. 3 in which a drill 113 is held by the operator's hand 116 and in which the operator's other hand 114 is holding the device 150. In this particular case the sheet of material being worked upon 500 is of a magnetic material and a magnetic ring 510 has been fastened about the base of the device 150 by use of a screw 512. The cord 514 is not shown connected to power, but again this is for purposes of clarity and it will be understood that the cord 514 will be connected to power when it is desired to magnetize the ring of the electro-magnet 510. When the electro-magnet 510 is energized it will be clear that the device will be held firmly in position upon the steel plate and under such circumstances additional benefits will be achieved wherein the operator need not even hold the device 150 with his hand 114.

Figure 10:
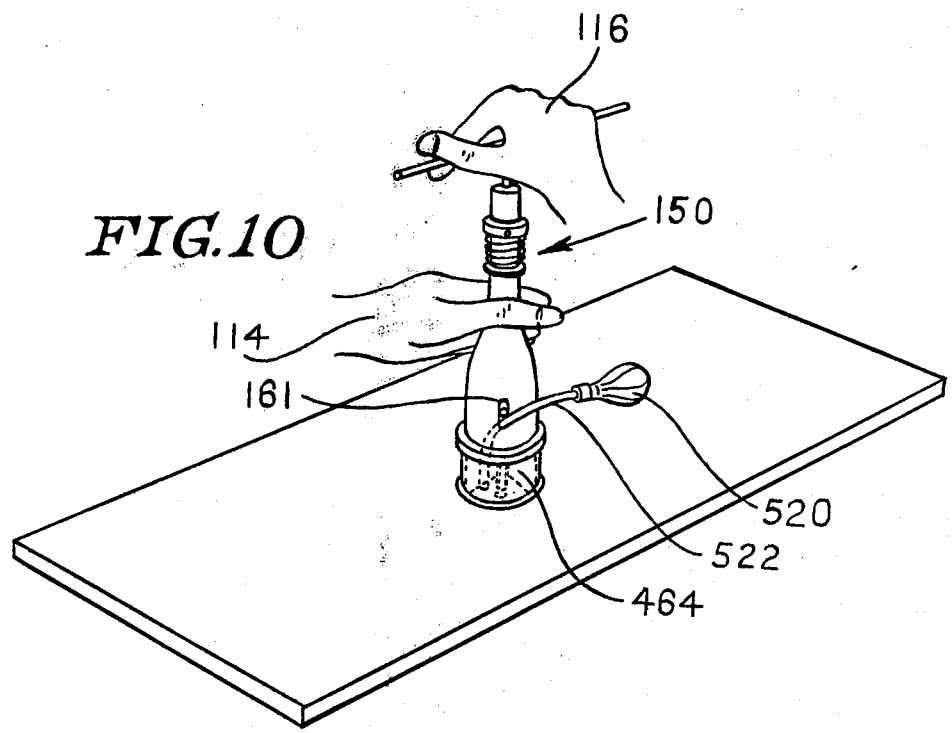
FIG. 10 is a perspective of the use of this method and apparatus in which a syringe is being used to remove fluid contained within the device.

FIG. 10 illustrates with more particularity a use of a syringe 520 with a flexible hose attached thereto 522 being inserted through the drill chuck T-slot 161 of the device 150. In this manner, the cutting fluid and the like as may be desired may be introduced and exhausted from the holding cylinder section 464 so that there will be no large mess of fluid and the like formed upon the work piece. This is particularly valuable in the case of highly polished surfaces and the like. In this particular instance a tapping operation is being illustrated in which the operator is holding the device 150 with one hand 114 and turning the tap handle with the other hand 116.

While the embodiment of this invention specifically shown and described is fully capable of achieving the objects and advantages desired, it is to be understood that the particular embodiments have been shown and described for illustrative purposes only and not for purposes of limitation.

I claim:

1. A hand-held workpiece engaging tool for drilling and the like comprising:

a hollow housing having an elongated upper bearing guide and gripping section and a lower workpiece engaging section;

the housing upper section including a central elongated internal bearing surface and an external surface suitable for gripping by the user at a distance from a work surface;

the housing lower section being substantially wider than the housing upper section and having both a wide and deep inwardly tapering cut out section for engaging circular workpieces of varying diameter and other non-planar workpieces, and also having a flat end surface for engaging flat workpieces;

an elongated cylindrical shank longer than the housing which extends down therethrough and is smooth surfaced and dimensioned to give a bearing fit for both rotative and longitudinal movement with respect to the internal bearing surface;

the shank including a chuck having adjustable jaws for holding a tool at its lower end, and an elongated shaft at its upper end for engaging power tool members;

spring means positioned on the outside of and extending above the housing clear of the shank for providing longitudinal spring bias of the shank with respect to the housing, the spring having an inner diameter substantially greater than the external dimensions of the shank for assuring sufficient clearance therefrom to permit unrestricted longitudinal movement between the spring and shank; and the shank being connected to the spring through an adjustable rotative bearing and stop assembly including a collar fixedly connected to the shank, and an intermediate bearing member disposed between the upper end of the spring, and, the collar and the bearing member having flat planar bearing surfaces in engagement with each other.

2. The hand-held workpiece engaging tool as set forth in claim 1, wherein:

the housing is a thin-walled unitary piece and said lower cut out section includes two opposed deep and wide matching V-notches approximately equal in width to the width of the upper section to permit the gripping of circular workpieces of diameters approximately equal to the width of the housing upper section.

3. The hand-held workpiece engaging tool of claim 2, wherein:

the chuck has a means for adjusting said jaws at one side thereof, and the housing has an elongated longitudinal slot through which the adjusting means element can be reached.

4. The hand-held workpiece engaging tool as set forth in claim 1, wherein:

the housing lower section includes means for receiving and holding ring means to form a seal between the workpiece and the housing.

5. The hand-held workpiece engaging tool as set forth in claim 1, wherein: magnetic means are provided for holding the hollow housing upon a workpiece.

6. The hand-held workpiece engaging tool as set forth in claim 1 wherein: means are provided to insert and remove cutting fluid.

* * * * *